US009025921B2

(12) United States Patent
Johnson

(10) Patent No.: US 9,025,921 B2
(45) Date of Patent: May 5, 2015

(54) VIBRATION DAMPER FOR HIGH POWER FIBER OPTIC TRANSPORT CABLES

(71) Applicant: BAE Systems Information and Electronic Systems Integration Inc., Nashua, NH (US)

(72) Inventor: Benjamin R. Johnson, Nottingham, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 73 days.

(21) Appl. No.: 13/799,736

(22) Filed: Mar. 13, 2013

(65) Prior Publication Data

US 2014/0270663 A1    Sep. 18, 2014

Related U.S. Application Data

(60) Provisional application No. 61/670,244, filed on Jul. 11, 2012.

(51) Int. Cl.
*G02B 6/44*    (2006.01)

(52) U.S. Cl.
CPC .................................. *G02B 6/4429* (2013.01)

(58) Field of Classification Search
CPC .... G02B 6/4494; G02B 6/443; G02B 6/4433; G02B 6/4403; G02B 6/4475; G02B 6/4401; G02B 6/44

USPC .......................... 385/100, 102, 104, 105, 147
See application file for complete search history.

(56) References Cited

U.S. PATENT DOCUMENTS 6,010,411 A  *  1/2000  Reyes ............................ 473/345
2008/0028499 A1*  2/2008  Skottheim et al. ................. 2/414

OTHER PUBLICATIONS http://www.aflglobal.com/Products/Conductor-Accessories/Fiber-Optic-Cable-Hardware/ADSS-Hardware/Spiral-Vibration-Damper-for-ADSS-Cable.aspx. 2002-2012, AFL, Revision 3, Jul. 23, 2012.

* cited by examiner

*Primary Examiner* — Jennifer Doan
(74) *Attorney, Agent, or Firm* — Daniel J. Long

(57) ABSTRACT

Embodiments of a method and apparatus for controlling the mechanical stabilization of an optical fiber are disclosed. The method may consist of placing an inflatable bladder between an optical fiber and a protective jacket. The bladder may be inflated with air, inert gas, or liquid to a desired pressure. The bladder may be sectioned to extend along part of or the entire length of the fiber. The bladder may isolate the optical fiber in a periodic fashion. The temperature of the material inside the bladder may vary axially along the optical fiber. Embodiments of the invention can stabilize the optical fiber by providing mechanical isolation from vibration and other perturbations. Embodiments of the invention can also alter Stimulated Brillouin Scattering ("SBS") and Stimulated Raman Scattering ("SRS") thresholds using either thermal or vibrational perturbations.

23 Claims, 3 Drawing Sheets

VIBRATION DAMPER FOR HIGH POWER FIBER OPTIC TRANSPORT CABLES

CROSS REFERENCE TO RELATED CASE

The present invention is related to and claims the benefit of priority of U.S. Provisional Patent application No. 61/670,244, filed on Jul. 11, 2012 and entitled "Vibration Damper for High Power Fiber Optic Transport Cables."

BACKGROUND OF THE INVENTION

1. Field of the Invention

The present invention relates to high power fiber optic transport cables, and more particularly to methods and apparatus for providing mechanical isolation from perturbations impinging on such cables in harsh environments.

2. Description of Prior Developments

High power fiber optic transport cables are currently protected with Kevlar reinforced plastic jacketing and flexible metal armored cables. Such protection is effective at providing mechanical protection from environmental stresses, but ineffective at providing consistent mechanical stabilization along the length of the optical fiber in high power fiber optic transport cables. Mechanical stabilization is required in the new generation of large core (>20 um), single mode optical fibers such as Leaky Core Fibers, Chiral Coupled Core Fibers, High Order Mode Fibers, and Large Mode Area Fibers. Mechanical perturbations on these new fibers can disrupt the fiber's ability to propagate the optical field in a single mode along the entire length of the fiber. This results in inadequate beam quality, inconsistent optical performance, and unstable power transmission. Thus, the protection of high power fiber optic transport cables still has many needs for which a solution is required.

Need for Modal Quality

As fiber lasers and amplifiers increase in power the need for larger core optical fibers that operate in the high brightness, single transverse mode regime increases. This has pushed the optical fiber industry to develop unique fiber geometries and unique wave guiding strategies that coerce an optical fiber into single mode operation despite basic physics principles dictating otherwise. The Large Core Optical Fibers (LCOF) under discussion are known as Large Mode Area (LMA), Chirally Coupled Core (CCC), High Order Mode (HOM), and Leaky Core Fibers (LCF). The ability of these fibers to transmit, or propagate, the optical power in a single transverse mode depends highly on the mechanical stability of the fiber. The delicate conditions required for single mode propagation are easily disrupted in environmentally demanding applications such as those, for example, on military aircraft.

Single transverse mode operation in LCOFs is achieved via differential mode loss of higher order modes from the fiber optic core to the surrounding cladding or a secondary core structure. The modal phase matching characteristics of LCOFs that encourage efficient coupling of higher order optical modes into the cladding of the optical fiber depend highly on the mechanical stability of the fiber. Mechanical perturbations disrupt such conditions and therefore prohibit efficient single mode operation of large core optical fibers. Under transient conditions the degree of higher order mode coupling into the cladding can differ along the length of the fiber and vary temporally. The temporal fluctuations lead to variations in optical power and gross degradations in beam quality and optical brightness. The degradation in single mode performance of LCOF fibers is greatly exacerbated when fiber lengths exceed several meters in length.

Need for Stable, High Extinction Polarization

The polarization stability of polarization maintaining (PM) LCOFs also depends on the mechanical stability of the fiber. Mechanical perturbations on PM fibers disrupt the intrinsic birefringence of the fiber that provides the designed polarization stability. The disruption arises from the photoelastic effect where the refractive index of an optical glass is dependent on the mechanical stress it is under. When periodic (or randomly distributed) vibrations impinge PM optical fiber, temporal fluctuations of polarization quality (degree of linear polarization, polarization orientation) occur. This is detrimental for applications such as nonlinear frequency conversion, or wavelength shifting using Stimulated Raman Scattering ("SRS"), or other applications requiring stable, highly polarized energy.

Need for Stable Power and High Brightness

High optical brightness is often required in military applications utilizing lasers, particularly in IRCM and Target Designation applications. The brightness of a source depends on the absolute power/energy of the source and the size of the desired spot on the "target." On military platforms, for example helicopters, the source and output are often remotely located—requiring the need for optical transport cables. As the brightness requirements of such applications increases, the absolute optical power is increased. The increased power requirements push the material limits of current optical fiber technology, requiring the implementation of above mentioned LCOFs in such applications. This naturally leads to an application conflict where the required product is inadequate or less than ideal. Under vibration the current LCOFs will exhibit fluctuations in power due to differential mode coupling differences along the length of the fiber. This results in a lower brightness beam with temporally inconsistent power.

Need for Increased SBS Threshold

Single wavelength lasers, or very narrow bandwidth lasers, of significant powers (>10 W), particularly when pulsed to higher peak powers, are limited in applications utilizing optical fibers due to the nonlinear process known as Stimulated Brillouin Scattering ("SBS"). SBS is an inelastic scattering process that couples energy from a "pump" wave into a lower energy "signal" wave, or an anti-stokes wave, via spatial phase matching by a pump-generated, counter propagating acoustic phonon. This threshold is both material dependent and dependent on the geometrical properties (waveguide area, shape, length) of the waveguide and propagating beam. The threshold for SBS is generally low in single frequency fibers and results in a gross limiting of output power from the laser.

Need for SRS Alteration

Several wavelength shifting architectures use SRS to generate wavelengths that are not readily accessible by common solid-state, fiber, gas, dye, or diode lasers. Raman scattering is an inelastic scattering process where the energy from a optical "pump" wave to a "signal" wave, or stokes wave, occurs via optical coupling through a co-propagating optical phonon. The emitted signal wave is lower in energy by a material dependent energy constant. SRS is a process that is both desired and avoided in fiber lasers and amplifiers depending on the application. Many telecom amplifiers use SRS, known as Raman Amplifiers, to amplify optical energy in a broad frequency spectrum. Some high power fiber lasers exploit SRS to frequency shift light from a pump frequency to a desired frequency. Conversely, in some high power fiber lasers, SRS is avoided due to the transfer of energy from one frequency to an unwanted frequency. This is all application dependent.

In sum, there is a need for an invention to improve degradation of beam quality, polarization instability, decreased brightness, and power transmission inefficiency in high power, fiber optic transport cable assemblies in harsh environments. There is also a need for an invention to provide preferential enhancement or mitigation of nonlinear fiber optic processes, such as SRS or SBS.

SUMMARY OF THE INVENTION

Embodiments of the present invention may provide a solution to these needs by providing mechanical isolation from perturbations impinging on a high power fiber optic transport cable in harsh environments. In one embodiment, this isolation may be performed by providing a mechanical buffer between the optical fiber and the protective jacketing in the form of a symmetric, inflatable bladder that exerts even pressure on the optical fiber. The mechanical buffer may consist of a concentric, extruded bladder with inflation ports located on the exterior of the armored jacket. The concentric bladder can be inflated to a desired pressure with an engineered gas or fluid to provide a custom tailored isolation profile. The bladder may be implemented in a static system or a closed loop circulating system to provide active thermal management.

BRIEF DESCRIPTION OF THE DRAWINGS

Embodiments of the invention, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
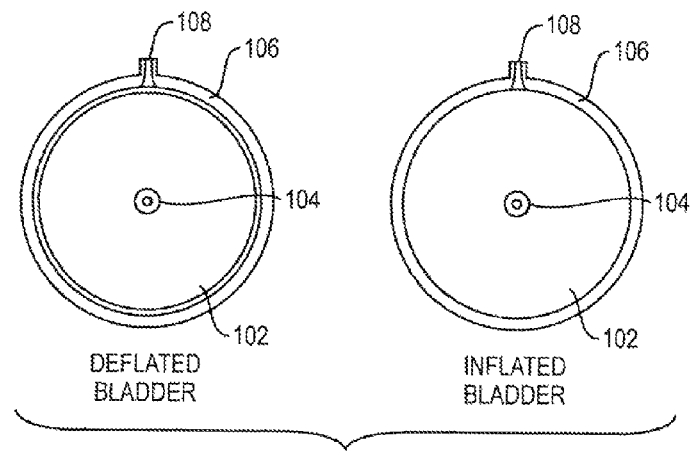
FIG. 1 shows a cross section view of an isolation bladder before and after inflation.

Referring now to the drawings, FIG. 1 shows a cross-section view of a symmetric, inflatable bladder 102 located between an optical fiber 104 and an armored jacket 106 both before and after inflation. The bladder 102 may exert an even pressure on the optical fiber 104. The bladder 102 may stabilize the wave guiding properties of the optical fiber 104 by providing mechanical isolation from vibration and other perturbations. The bladder 102 may be inflated with air, inert gas, or a fluid via an inflation port 108, and may provide an engineered thermal or vibrational perturbation to disrupt the acoustic wave guiding properties of the optical fiber 104. This may increase the threshold of Stimulated Brillouin Scattering ("SBS"). Additionally, the bladder 102 may alter the threshold for Stimulated Raman Scattering ("SRS").

The bladder 102 can provide a mechanical dampening medium that is easily customizable according to the demands of the application. The bladder 102 may be oriented linearly, coiled, or in multiple curves conforming to a routing surface. The bladder 102 may also be fastened to a vibrating surface directly.

Embodiments of the present invention can both preserve the high order coupling of LCOFs and the single mode operation of LCOFs. Embodiments can also stabilize the degree of linear polarization and preserve the orientation of the light in LCOFs.

Figure 2:
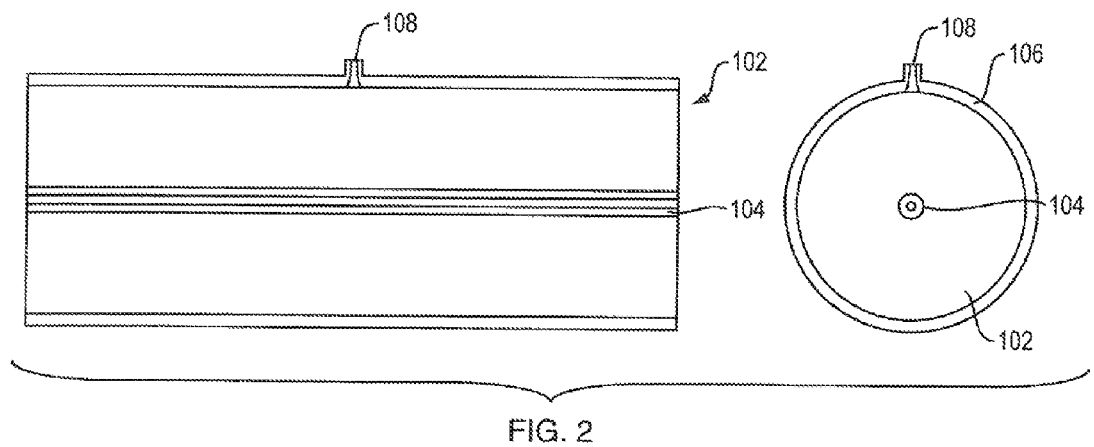
FIG. 2 shows a side view of an armored transport cable with an isolation bladder.

FIG. 2 shows a side view of the bladder extending along the length of the fiber. The bladder may be sectioned or extruded to extend along part of or along the entire length of the fiber.

Figure 3:
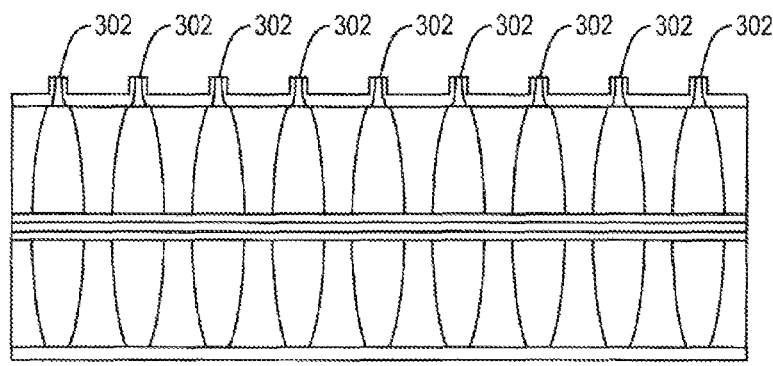
FIG. 3 shows a side view of a periodic bladder configured, for example, for SBS suppression or SRS enhancement.

Embodiments of the present invention may increase the SBS threshold by disrupting the propagation of the acoustic wave within the optical waveguide. The mechanical disruption can be in the form of a thermal or vibration perturbation that essentially destroys the acoustic waveguide properties of the optical waveguide. As shown in FIG. 3, in one embodiment, the acoustic wave may be disrupted by vibrating the transport cable while partially isolating the fiber with periodic bladders 302. If the periodic structure is employed, the periodic bladders 402 may contain fluid or gas that is of differing temperatures that subsequently disrupt the acoustic wave.

Figure 4:
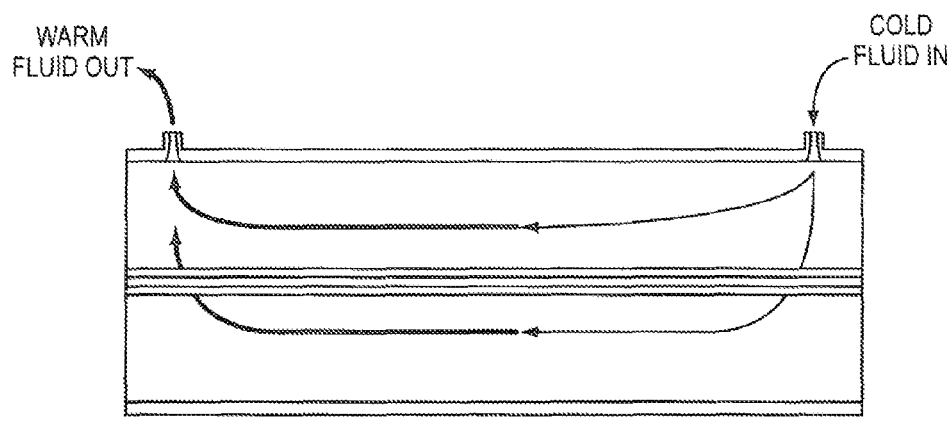
FIG. 4 shows an isolation bladder configured for active thermal management.

Embodiments of the present invention may alter the SRS or SBS threshold providing active thermal management to the bladder. FIG. 4 illustrates one process by which such active thermal management may be accomplished. Embodiments of the present invention may be operated in either a static thermal management system or in conjunction with a closed loop circulation thermal management system.

Figure 5:
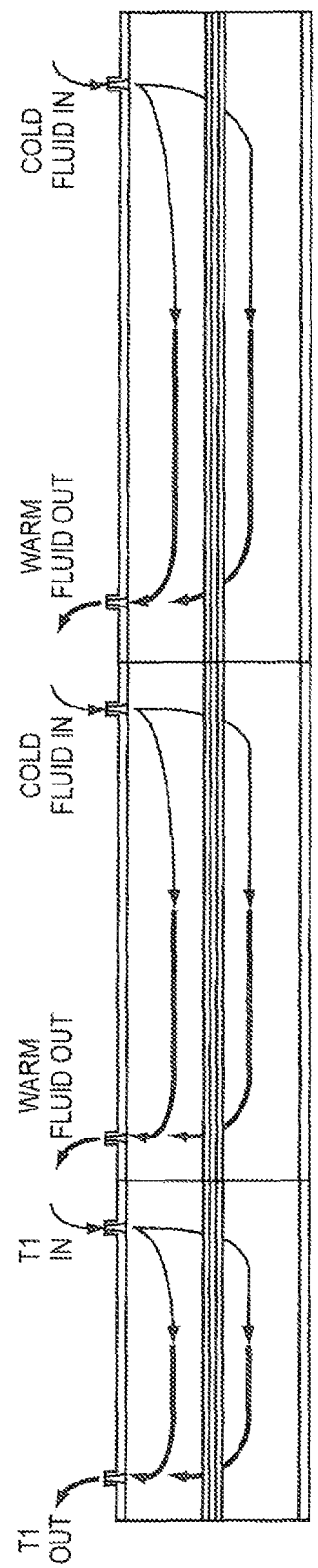
FIG. 5 shows an axially segmented bladder configured, for example, to create an axially varying thermal gradient.

Referring now to FIG. 5, embodiments of the present invention may alter the SRS threshold by providing an axially varying thermal gradient along the fiber. This axially varying thermal gradient may alter the index of refraction of the optical fiber and its intrinsic ability to host the phase matching optical phonon consistently along the length of the fiber; a condition that is critical for energy transfer to occur. The specificity of the thermal gradient may determine whether the threshold is increased or decreased.

While the present invention has been described in connection with embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An apparatus for controlling the mechanical stabilization of an optical fiber comprising:
    an inflatable bladder located between the optical fiber and a protective jacket; and
    a material selected from the group consisting of air, inert gas, and liquid within said inflatable bladder, wherein the inflatable bladder acts as a mechanical dampening medium thereby by providing mechanical isolation to the optical fiber from vibrational perturbations.

2. The apparatus of claim 1 wherein said inflatable bladder is inflated via at least one inflation port located on an exterior of said protective jacket.

3. The apparatus of claim 1 wherein said inflatable bladder is sectioned to extend along one or more parts of said optical fiber.

4. The apparatus of claim 1 wherein the temperature of said material selected from the group consisting of air, inert gas, and liquid varies axially along said optical fiber.

5. The apparatus of claim 1 wherein said inflatable bladder has an orientation selected from the group consisting of linear, coiled, and multiple curves.

6. The apparatus of claim 1 where said inflatable bladder is directly fastened to said optical fiber.

7. The apparatus of cairn 1 wherein said inflatable bladder is operated in a static thermal management system.

8. The apparatus of claim 1 wherein said inflatable bladder is operated in conjunction with a closed loop circulation thermal management system.

9. The apparatus of claim 1 wherein said inflatable bladder is placed between said optical fiber and said protective jacket in periodic installments.

10. The apparatus of claim 9 wherein said material selected from the group consisting of air, inert gas, and liquid contained in said periodic installments is of differing temperatures.

11. A method for controlling the mechanical stabilization of an optical fiber comprising the steps of:
obtaining an inflatable bladder; and
placing said inflatable bladder between the optical fiber and a protective jacket such that said inflatable bladder exerts even pressure on said optical fiber, wherein said inflate bladder stabilizes wave guiding properties of said optical fiber by providing mechanical isolation to the optical fiber from vibrational perturbations or thermal perturbations.

12. The method of claim 11 further comprising the step of inflating said inflatable bladder to a predetermined pressure with a material selected from the group consisting of air, inert gas, and liquid.

13. The method of claim 11 wherein said inflatable bladder is sectioned to extend along one or more parts of said optical fiber.

14. The method of claim 11 further comprising the step of axially varying the thermal gradient along said optical fiber.

15. The method of claim 11 wherein said inflatable bladder is operated in a static thermal management system.

16. ne method of claim 11 wherein said inflatable bladder is operated in conjunction with a closed loop circulation thermal management system.

17. The method of claim 11 further comprising the step of vibrating said optical fiber.

18. The method of claim 11 wherein said inflatable bladder is placed between said optical fiber and said protective) jacket in periodic installments.

19. The method of claim 18 wherein said material selected from the group consisting of air, inert gas, and liquid contained in said periodic installments is of differing temperatures.

20. A apparatus for controlling the mechanical stabilization of an optical fiber comprising:
an inflatable bladder located between the optical fiber and a protective jacket;
a material selected from the group consisting of air, inert gas, and liquid within said inflatable bladder, wherein the temperature of said material varies axially along said optical fiber thereby providing an axially varying a thermal gradient along the optical fiber; and
at least one inflation port located on an exterior of said protective jacket.

21. The apparatus of claim 1 wherein the it flat le bladder is sectioned to extend along an entire length of the optical fiber.

22. The apparatus of claim 1 wherein the inflatable bladder by incorporating an active thermal management increases a Stimulated Brillouin Scattering (SBS) threshold of the optical fiber.

23. The apparatus of claim 20 wherein a Stimulated Raman Scattering (SRS) threshold of the optical fiber alters by the axially varying thermal gradient along the optical fiber.

* * * * *